(12) United States Patent
Reinikainen et al.

(10) Patent No.: US 6,607,770 B2
(45) Date of Patent: *Aug. 19, 2003

(54) PROCESS FOR THE MANUFACTURE OF DRY BAKED PRODUCTS

(75) Inventors: Antero Reinikainen, Kotka (FI); Sampsa Haarasilta, Kerava (FI); Kauko Reinikainen, Kotka (FI); Erkki Pontinen, Kyminlinna (FI)

(73) Assignee: Vasanmylly Oy, Helsinki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 61 days.

(21) Appl. No.: 09/380,529

(22) PCT Filed: Mar. 13, 1998

(86) PCT No.: PCT/FI97/00227
§ 371 (c)(1),
(2), (4) Date: Jun. 2, 1999

(87) PCT Pub. No.: WO98/41098
PCT Pub. Date: Sep. 24, 1998

(65) Prior Publication Data
US 2002/0155205 A1 Oct. 24, 2002

(30) Foreign Application Priority Data
Mar. 17, 1997 (FI) .................................................. 971119

(51) Int. Cl.⁷ .............................................. A21D 8/00
(52) U.S. Cl. ........................................ 426/497; 426/503
(58) Field of Search .................................. 426/549, 552, 426/808, 496, 497, 503

(56) References Cited

U.S. PATENT DOCUMENTS

| | | | |
|---|---|---|---|
| 3,770,358 A | 11/1973 | Steels et al. | 425/291 |
| 4,276,800 A | 7/1981 | Koppa et al. | 83/863 |
| 4,391,832 A | 7/1983 | Haas, Sr. et al. | 428/275 |
| 4,518,617 A | 5/1985 | Haas, Sr. et al. | 426/231 |
| 4,865,862 A * | 9/1989 | McFeaters | 426/496 |

FOREIGN PATENT DOCUMENTS

| | | |
|---|---|---|
| EP | 0 289 790 | 11/1988 |
| FI | 58578 | 11/1980 |
| FI | 83283 | 3/1991 |
| GB | 1 359 661 | 7/1974 |
| SE | 421167 | 12/1981 |
| SE | 442372 | 12/1985 |

OTHER PUBLICATIONS

Hoseney, R. Principles of Cereal Science and Technology., AACC Publishing., p. 290–295, 1986.*
Derwent's abstract, No. 86–47571/07, week 8607, Abstract Of SU, 1169–584 (Mosc Food Ind Techn), Jul. 30, 1985.

* cited by examiner

Primary Examiner—Arthur L. Corbin
(74) Attorney, Agent, or Firm—Nixon & Vanderhye P.C.

(57) ABSTRACT

The invention relates to a process for manufacturing dry baked products in the form of ready-for-use pieces. In the process of the invention, a baked bread sheet is divided into ready-for-use pieces while the starch of the bread sheet is in elastic state, the bread sheet remaining continuous, and the hardened ready-for-use pieces are separated from one another. The invention also relates to products obtained in this manner and by processing them further. Typical products of the invention comprise crispbreads, torn rusks, like thin crispbreads, torn breadrings dried on a bread pole, and baked snacks. The invention also relates to high-fiber baked snack products.

8 Claims, 1 Drawing Sheet a)

b)

PROCESS FOR THE MANUFACTURE OF DRY BAKED PRODUCTS

BACKGROUND OF THE INVENTION

The invention relates to a process for manufacturing ary baked products and the like, such as crispbreads, torn rusks, for instance thin crisp-breads, torn breadrings dried on a bread pole, and baked snacks. The products are so called 'plain' products, but they can be processed further, for instance, by coating, filling, sprinkling or seasoning. With the process of the invention, products in the form of ready-for-use pieces are obtained, which products may be, for instance, round crispbread—or thin-crispbread-based snacks.

The invention also relates to baked products manufactured with said process and their use for preparing further processed products. The invention also relates to products obtained by said further processing.

The products according to the invention are typically wholemeal products and thus very high in fiber. In further processed products, low-calorie and low-fat compositions can preferably be used as fillings/coatings. The invention allows manufacturing of products that are usable, for instance, as wholesome dietary products.

It has been observed that today the consumer desires, more and more, baked products of snack-type that are in the form of ready-for-use pieces or easily divisible into ready-for-use pieces. In these kinds of snack-products, attempts are made to achieve preferably small and thin products, for instance, so called 'bite-size' products. In the manufacture of these products, problems have arisen from cereal ingredient.

When manufacturing round crispbreads, ready-for-use pieces are conventionally formed before baking in the oven by cutting round cakes of the crispbread dough, rolled into a sheet. The round crispbread cakes are conveyed into a baking oven. Surplus dough between the cakes causes dough loss, which can be prevented by returning it as 'return dough' to the beginning of the process to be remixed with fresh dough. Adding the return dough has a negative effect on the quality of the product, for instance, on colour. At baking step, the edges of round cakes tend to bake more than the centres, so baking is uneven, and moreover, filling the oven grate evenly with small products is a problem. When the size of a product is reduced, also another problem arises, i.e. at dough step, before baking, the production line tends to get jammed, for instance, when transferring round dough cakes from one dough cloth onto another.

When producing conventional, rectangular crispbread pieces, the crispbread dough is baked in the oven as a continuous sheet or plate, and the ready-for-use pieces are formed after baking by cutting and sawing, so that the bread structure shows at the outer edge of the product, i.e. the edge is 'open'. This method brings about a problem, for instance, that at baking step dark, scorched edges are in general formed in the dough sheet or plate that have to be cut off, and as a result product loss may be quite considerable. Product loss occurs also in connection with sawing ready-for-use pieces. When manufacturing conventional crispbread, product loss at cutting and sawing step may be in the range of 10 to 12%, and with small product pieces the product loss may increase up to 25 to 35%.

Finnish Patent 58,578 discloses a process for manufacturing crisp-breads and corresponding products. In this process, breaking lines, i.e. weakening lines for breaking up consumer pieces or serving pieces, are scored in a pre-baked product. The score is done on the surface of the dough sheet only, not all way through the dough sheet to the bottom of the dough sheet. The scoring technique in accordance with the Finnish Patent is illustrated in FIG. 1, point a) showing a cross section of a bread sheet with a scoring mark 1 in the upper crust of the bread sheet. The scoring mark does not reach the crumb structure 3 of the bread sheet, nor the bottom crust 4. Thus, products, i.e. final ready-for-use pieces are not essentially cut out from the dough sheet, but the forming of final ready-for-use pieces always necessitates breaking up at a later stage his process permits manufacturing of rectangular products only, not for instance, round products. Forming the ready-for-use pieces is effected, for instance, by sawing in a longitudinal direction and breaking up in a transversal direction.

The manufacture of torn products, for instance, thin crispbreads, comprises an additional step of tearing the baked bread sheet. The torn thin crispbread sheet is divided into ready-for-use pieces after baking, and the pieces are dried and as a consequence they tend to bend/curl up.

It is essential to the process of the invention that a baked bread sheet, in the form of a continuous plate, is divided into ready-for-use pieces while the starch in the bread sheet is in elastic state, the bread sheet remaining essentially continuous, and the hardened ready-for-use pieces are then detached from one another. In connection with the present invention, hardened ready-for-use pieces and hardened bread sheet refer to such a bread sheet/ready-for-use pieces whose starch is crystallized, non-elastic, after baking/drying.

SUMMARY OF THE INVENTION

The invention relates to a process for the manufacture of dry, baked products in the form of ready-for-use pieces, in which process a dough sheet is prepared that is docked and baked, possibly torn and possibly dried. The process is characterized by comprising following steps:

the baked bread sheet is divided into ready-for-use pieces while the starch in the bread sheet is in elastic state, the bread sheet remaining essentially continuous, and the hardened ready-for-use pieces separate or are made to separate from one another.

The division into ready-for-use pieces is preferably carried out by using a patterning device provided with blades that are pressed in the bread sheet, which is in elastic state, in such a manner that the blades penetrate the surface of the bread sheet and substantially go all the way through the bread sheet to the bottom of the bread sheet.

In the process of the invention, division into ready-for-use pieces can be carried out after baking, or alternatively, in connection with drying or thereafter, it is essential that the starch contained in the bread sheet is in elastic state. The bread sheet is to be warm, typically over 60° C.

When manufacturing torn products, for instance thin crispbreads, division into ready-for-use pieces is carried out after baking and tearing, or alternatively, in connection with drying or thereafter, while the bread sheet is still warm. If the products are desired to be as planar as possible, division into ready-for-use pieces is carried out preferably in connection with drying or thereafter, while the bread sheet is warm. In case it is not substantial that the product has an absolute plane form, in other words, the products may be, for instance, bent or curled up, division into ready-for-use pieces may be carried out immediately after baking.

DESCRIPTION OF THE FIGURES

In practice, division into ready-for-use pieces can be carried out by cutting, scoring, punching or perforating by using a patterning device provided with cutting, scoring, punching or perforating blades. In cutting, scoring and punching, continuous patterns corresponding to the size and shape of the product are pressed in the bread sheet, and in perforation the patterns pressed are dotted lines. In patterning, it is essential that the blades of the patterning device are pressed sufficiently deep in the structure of the bread sheet, so that the ready-for-use pieces essentially separate from one another when drying and cooling down, when 'hardening'. The 'deep scoring' or 'deep patterning' technique according to the invention is illustrated in FIG. 1, point b) for crispbread. The figure shows that the cutting mark 1 first goes through the upper crust 2 of the bread sheet, thereafter through the crumb structure 3 of the bread sheet, reaching into the bottom crust 4 of the bread sheet.

DETAILED DESCRIPTION

Figure 1:
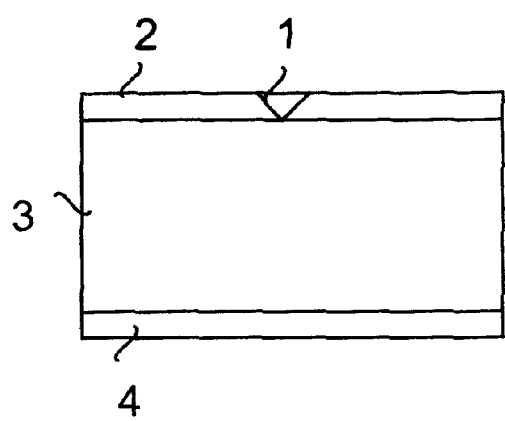
FIG. 1, point a) illustrates a conventional weakening score.
Figure 1:
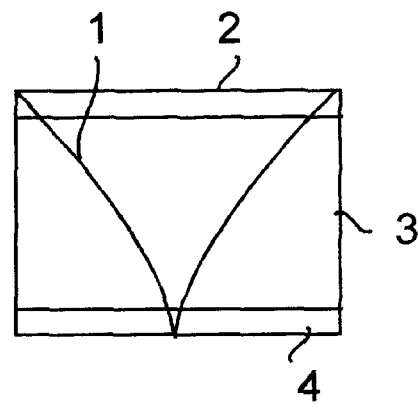

In one preferred embodiment of the invention, the bread sheet is divided into round products by producing round patterns in the bread sheet. The process is particularly suitable for manufacturing small products, for instance, products that are less than 5 cm in diameter, and particularly, so called 'bite size' products. Reducing the size of the product manufactured by the deep cutting or deep patterning technique according to the invention does not substantially increase product loss.

The invention further relates to a product manufactured by the above-described processes and the use of the product for further processing.

The invention also relates to a dry, baked product that is characterized in that, on the outer circumference of the product, the crust of the baked product is essentially turned towards the bottom of the product. By the expression 'the crust is essentially turned towards the bottom of the product' it is meant that the outer circumference of the product is not 'open', as for example, in products that are divided into individual pieces by sawing after drying, but the outer circumference of the product is not completely close either, as is the case with individually baked products. The invention also relates to an intermediate product for producing dry, baked products, characterized in that the skinlike crust on the outer circumference of the baked product is essentially closed, i.e. the upper and lower crusts on the outer circumference are essentially pressed against each other.

The products of the invention are preferably high-fiber snack products that can be further processed, for instance, by coating or filling. Coating/filling is preferably a light coating or light filling. A light coating or light filling preferably contains light fat, and it may also contain polydextrose and/or flavourings.

The invention also relates to a high-fiber, baked snack product that is provided with low-calorie/light coating or filling. Light coating or filling preferably contains light fat, and additionally, it may also contain polydextrose and/or flavourings.

The process of the invention can be applied to all types of dry baked products. In the present invention, dry baked products refer to starchy baked products, made from grain or similar ingredients, the moisture content in products being typically in the range of about 3 to 20%, preferably about 5 to 9%. Preferably, the products are essentially planar and essentially crispy products.

The products are so called 'plain' products which refer to simple, dry baked products, such as crispbreads, and torn or cut rusks, such as thin crispbreads or wheat rusks produced by the thin crispbread technique. The products may also be so called baked snacks, which may be crispbread—or thin-crispbread-based, for instance. The products may also be similar to torn breadrings dried on a bread pole.

In the present invention, torn rusks refer to baked and torn products that are also toasted or dried, in general in the oven. Breadrings dried on a bread pole refer to typically thin rye breads, torn open after baking, and thereafter dried on bread poles. Baked snacks refer to starch-based products made from grain or similar ingredients, which products are ready-for-use snacks as such.

The most important products of the invention comprise torn or cut rusks, for instance, wheat rusks and thin crispbreads, and crispbreads, as well as baked snacks based on these products. The products of the invention also comprise torn breadrings dried on a bread pole. The process can also be applied to various pet products.

The baked products manufactured in accordance with the invention are preferably wholemeal products, most preferably rye-based products. Other applicable ingredients comprise, for instance, wheat, oat, barley, maize, rice, buckwheat and other starch-based ingredients and mixtures thereof.

In the process of the invention, a dough is prepared first with conventional methods, suitable for dry baked products. Conventionally used dough ingredients comprise flour or flour mix, water or other dough liquid, salt (in general), and possibly yeast and other additives. The ingredients are mixed into a dough and the dough is proofed by using fermentation (yeast), leavening agents (various baking powders) or beating method (ice bread).

By means of a dough brake equipment, the suitably proofed dough, is sheeted, and the dough sheet is docked, in other words, embossed. In addition to appearance, when preparing crispbread for instance, the purpose of docking is to attach the upper crust to the bottom of the bread and thus prevent the crust and bottom from separating from one another during the baking process in the oven.

After docking, the dough sheet is baked at a carefully programmed temperature. Dry baked products are typically baked quickly at a relatively high temperature.

When torn products, such as thin crispbreads, are concerned, after baking in the oven the bread sheet obtained is torn into upper and lower halves as a continuous sheet. This results in a torn product in the form of two continuous sheets (upper rusk and lower rusk) with one torn, uneven surface and one even, untorn surface.

After baking, while the grain starch is still soft and the bread sheet obtained is in elastic state, the bread sheet is divided into ready-for-use pieces by using the patterning device whose blades press in the bread sheet patterns corresponding to the shape of the desired ready-for-use pieces. At that point, the bread sheet is still a continuous product in the form of a plate or a band. Patterning can be carried out with a cutting, scoring, punching or perforating device. The blades of the device are pressed in the bread sheet that is still in elastic state, so that they go through the surface of the bread sheet and essentially penetrate through the bread sheet down to the bottom.

When non-torn products, such as crispbreads, are concerned, the surface of the bread sheet refers to the upper crust of the bread sheet. In torn products, patterning can be effected either on a torn surface or non-torn surface, i.e. on the crust, so with regard to torn products, the expression 'surface of the bread sheet' refers either to the crust of the bread sheet or the torn surface of the bread sheet, depending on which side the patterning is effected.

As stated above, at the patterning step the blades go through the surface of the bread sheet and essentially penetrate the bread sheet down to the bottom, while the bread sheet is still in the form of a continuous plate. The patterning mark becomes close, even 'sticks' partly together, later on when the structure solidifies, and as a consequence, the bread aromas are better preserved compared with products that are individually baked or broken into pieces by sawing.

The patterns on the bread sheet may vary in accordance with the shape and size of the final product. Thus for instance, round, polygonal, for instance regularly hexagonal, or rectangular, for instance square, patterns may be effected on the bread sheet. For instance, triangular or diamond-shaped patterns may also be effected on the bread sheet. Most preferable shapes are a circle, hexagon and square.

Various decorative patterns, for instance, animal patterns, can also be effected on the bread sheet.

To minimize the amount of scrap dough, the patterns to be formed, for instance, round patterns, touch each other as closely as possible.

To produce patterns, a dough brake rotating about its axis (preferably horizontal axis) can be used, for instance, the dough brake being provided with a blade system that can produce the desired patterns. As the continuous bread sheet advances and the dough brake rotates, the blades of the dough brake press in the bread sheet the patterns of desired size and shape.

An elastic backing-roll is preferably used when producing patterns to the effect that the blades of the patterning device penetrate through the bread sheet. The elastic backing-roll enables sufficiently deep patterning and even cutting without damaging the blade of the device. Sufficiently deep patterning enables the ready-for-use pieces to separate from one another.

The invention also relates to a device for implementing the process of the invention, the device comprising a roll provided with patterning blades and an elastic backing-roll.

If the patterns are round, i.e. when manufacturing round products, surplus bread sheet, baked together with ready-for-use pieces, remains between the round patterns corresponding to said pieces, even though the patterns are partly attached to one another. The baked sheet in between is separated from the final products at a later stage, at the same time when the products are separated from one another.

After patterning, the bread sheet is allowed to become hard, whereby starch contained in the bread sheet crystallizes, and after the bread has shrunk and the starch has become brittle in drying, the pieces separate from one another. At that stage, the bread sheet also becomes crisp, so that a crisped bread sheet can be referred to. When patterns are formed after baking, the patterned bread sheet is usually dried or toasted to obtain a hardened bread sheet. In some cases, mere cooling at room temperature, for instance, may suffice. Simultaneously, the bread sheet is brought to its final moisture content. In addition to reducing the moisture content, the purpose of toasting is to give the product colour and taste. Drying and toasting are usually performed in the oven, but as is the case with torn breadrings dried on a bread pole, drying can be performed on bread poles at a normal production space temperature.

If patterning is performed in conjunction with drying or thereafter, the hardening of the bread sheet takes place when the bread sheet is cooling down.

The process of the invention enables manufacturing of thin and small snack-type products, whose typical diameter may be in the range of 4 to 5 cm, for instance. The products are in the form of individual ready-for-use pieces. The products can be consumed, for instance, as wholesome and/or savoury snacks. The production capacity of the process of the invention is very high, permitting production of homogenous products that are evenly baked. The products keep straight, they do not curl up or break up. The process hygiene is also improved.

The invention also relates to the use of the products in accordance with the invention for the manufacture of further processed products. Moreover, the invention relates to resulting, further processed products.

These kinds of further processed products may comprise, for instance, products obtained by coating, filling, seasoning or sprinkling the surface, preferably high-fiber snack products. The products may be coated or filled, the coating/filling being preferably a light coating/filling. The light coating/filling typically contains light fat and may additionally contain polydextrose and flavourings.

The further processed products may be coated/filled with various coatings/fillings. So called 'sandwich' products are also comprised in these kinds of further processed products. Surfaces of the further processed products may be sprinkled with, for instance, poppy seeds or sesame seeds, bran or various coarsely ground materials, such as crushed nuts. The products may also be seasoned on the surface, the seasonings being applied on the surface of the baked product as such or mixed with a carrier. For instance, oil or fat can be used as the carrier. Seasonings can be applied on the surface of the product, for instance, by spreading or spraying as such or mixed with a carrier, also in such a manner that the carrier is applied first and thereafter the seasonings.

In this connection, further processing refers to extended processing of any one of the products according to the invention. For instance, the products may be coated by using any known processes. The coatings may be arranged in various ways, for instance, by applying them on a plain product in a melted form or by preparing first an individual coating in a suitable mould and thereafter combining it with a high-fiber baked product of the invention.

A wide variety of coating/filling compositions can be used in said further processed products. These comprise, for instance, creams and coatings. These may be sweet or non-sweet (e.g. savouries). Among sweet coating substances, various coatings, for instance, chocolate and chocolate-type coatings, yoghurt chocolate and jams can be mentioned. Among non-sweet savoury fillings, cheese- and ham-based fillings can be mentioned. Soursweet coatings/fillings (salsa) can also be used. Various spices or spice mixes, as such or with a carrier, can also be arranged on the surface of the products, for instance, by spreading or spraying. These comprise, for instance, dill and rainbow trout, and chilli seasonings, which can be applied on the surface of the product, for instance, by spreading or spraying, mixed with oil/fat, or in such a way that oil/fat is arranged first and thereafter the seasonings.

Particularly light products are obtained by using low-calorie and low-fat coatings/fillings as coatings/fillings, such as light (yoghurt) chocolate. Light fat is preferably used as the fat component of these substances.

Following examples illustrate the process and products of the invention.

EXAMPLE 1

Manufacture of round crispbread-based baked snacks

A rye-based crispbread dough was prepared in a dough mixer by combining dry and liquid ingredients. The resulting dough was passed through dough spreaders to a dough brake, in which a two metre wide, continuous dough sheet was formed on a floured cloth. Top flour was spread on the surface of the dough sheet, after which the sheet was docked. The dough sheet was proofed and fed into the baking oven.

Immediately from the baking oven the bread sheet was conveyed to a cutting device provided with a blade system to cut round shapes. The bread sheet was cut into round shapes, i.e. round ready-for-use pieces (with a diameter of 4 cm).

The bread sheet, divided into round ready-for-use pieces, but still in the form of a continuous plate was fed into the drying oven. At the drying step, ready-for-use pieces essentially separated from one another. The bread sheet comprising round ready-for-use pieces was conveyed to a conveyor plansifter where the round brispbread products remained on the plansifter, while the rest of the baked bread sheet fell through the planshifter apertures into a receiver.

The crispbreads obtained were stacked and packed or transferred to intermediate storing space for possible further processing.

Homogenous, evenly baked, thin, small, round crispbread-based products were thus obtained, which can be consumed as such, for instance, as wholesome snack products or further processed. At the further processing step, plain products obtained in this manner can be coated, for instance, with light chocolate or light yoghurt chocolate, which results in a high-fiber, low-calorie and low-fat, wholesome snack.

EXAMPLE 2

Manufacture of round thin-crispbread-based products

A rye-based thin-crispbread dough was prepared in the same manner as above. The dough was passed through dough spreaders to a dough brake in which a two metre wide sheet was formed on a floured cloth. Top flour was spread on the surface of the dough sheet, after which the dough was docked.

The dough was proofed and baked. After baking the bread sheet was torn into an upper rusk and a lower rusk. These were fed into separate drying ovens. Immediately upon drying, when the starch contained in the bread sheet of the product was still in elastic state and the product was still warm, the product was conveyed to a cutting device provided with a blade system to cut round shapes. By means of the cutter the product was divided into round ready-for-use pieces (with a diameter of 4 cm). In the obtained bread sheet, the ready-for-use pieces were apart from one another. The surplus bread sheet between the ready-for-use pieces was separated from the pieces by screening.

Round thin crispbreads were stacked, packed or transferred to intermediate storing space for possible further processing.

EXAMPLE 3

Further processed crispbread and thin crispbread products

A) Sandwich crispbreads and thin crispbreads

Stacked crispbreads were piled up in feeding ducts of the sandwich machine, where the machine extruded coating cream (e.g. chocolate or cheese cream) on the bottom bread and positioned the top bread on the ream, pressing the top and bottom breads lightly together. After this the product was transferred to packing department.

Sandwich thin crispbreads were prepared in the similar manner.

B) Coated crispbreads and thin crispbreads

Crispbreads from intermediate storing were fed into a chocolate/cheese glazing machine, in which a desired coating was fixed on one or both surfaces of the crispbread. The products were cooled and packed.

Coated thin crispbreads were prepared in the same manner.

C) Seasoned crispbreads and thin crispbreads

A crispbread sheet in the form of ready-for-use pieces, possible surplus breadsheet being screened away, was passed to an oil spraying apparatus, in which the product was sprayed with an oil seasoning of a desired taste (e.g. dill and rainbow trout, or chilli seasoning). Thereafter the product was cooled, and at the same time the oil and seasoning mixture was absorbed into the product. The products were packed into single-piece packages.

Alternatively, seasoning was carried out in such a manner that the crispbreads were supplied from intermediate storing into an oil drum, where the products became moist in oil. The oily products were passed into a seasoning drum, where seasoning adhered to the oily surface of the product. The product was cooled, the oil absorption was effected on the cooling conveyor, and the products were packed.

Seasoned thin crispbread products were prepared in the same manner.

EXAMPLE 4

Other applications (further processed products)

A) High-fiber coated product

A 'plain', snack-type rye product manufactured with the crispbread technique, described in the example 1, was coated with low-calorie light chocolate. The coating was prepared by combining 'salatrim' light fat (Benefat®) with conventional components of light chocolate. A delicious light snack product was obtained.

A plain-type snack product can also be manufactured with the Thin crispbread technique. In coating substance, also other light fats can be used, for instance Olestra®. As a sweetening agent, any of the following can be used: a sweetener with conventional energy content, like sugar, e.g. saccharose, or a light sweetener, e.g. polyols, like xylitol, lactitol, isomaltitol or the like, or intensive sweeteners like aspartame or alitame possibly with polydextrose. If the product desired is a high-fiber snack product containing more energy, either light or dark chocolate containing normal fat can be used as a coating.

B) High-fiber filled product

A 'plain' snack-type rye product manufactured with the crispbread technique, described in the example 1, was coated with a filling containing 'salatrim' light fat (Benefat®), and as a lightener, polydextrose (Litesse®) and low-fat cheese powder and seasonings. Another similar 'plain' rye product was arranged on top of this, and as a result a savoury, filled, light snack product was obtained.

A 'plain' snack product can also be manufactured, for instance, with the thin crispbread technique. The coating may comprise also other light fats (e.g. Olestra®). In case the product is desired to be a high-fiber snack product containing more energy, normal fat can be used for filling instead of light fat.

C) High-fiber, seasoned snack product

A baked 'plain' product of snack-type was manufactured with the thin crispbread technique, described in the example 2, a seasoning mix being applied to the product by means of light fat (Benefat®). Various products were manufactured by using, for instance, salmon/dill, chicken/curry, salsa and nacho seasoning mixes. The seasonings were mixed with fat, and this seasoning and fat mixture was spread on the surface of the plain product.

A plain snack product can also be manufactured, for instance, with the crispbread technique. The coating may comprise also other light fats (e.g. Olestra®). In case the product is desired to be a high-fiber seasoned snack product containing more energy, a filling/coating containing normal fat can be used as filling/coating.

When a high-fiber rye product is manufactured using light fat, the resulting product is a light snack which contains only one-third of the energy of a corresponding sandwich product provided with a filling or coating containing normal fat.

Additionally, the following tables show the product information of three further processed products of the invention, i.e. of a coated, filled and seasoned product.

1) Coated thin crispbread with milk chocolate filling containing 'salatrim' light fat Ingredients: Thin crispbread: wholemeal rye flour, yeast, salt Milk chocolate: sugar, 'salatrim' light fat, nonfat dried milk, cocoa powder, milk, fat, lecithin and vanillin. Nutritional information:

| Serving size: 120 g = 3 pieces | Reference product: chocolate coated cracker | |
|---|---|---|
| Calories per serving | 120 | 150 |
| Calories from fat | 50 | 75 |
| | per serving | per serving |
| Total fat | 5 g | 8 g |
| saturated fat | 5 g | 5 g |
| Cholesterol | 0 mg | 0 mg |
| Sodium | 45 mg | 45 mg |
| Total carbohydrate | 17 g | 16 g |
| dietary fibre | 1 g | <0.5 g |
| sugars | 13 g | 13 g |
| Protein | 2 g | 2 g |

2) Filled thin crispbread (sandwich product) with Cheddar filling with 'salatrim' light fat and polydextrose Ingredients: Thin crispbread: wholemeal rye flour, yeast, salt Cheddar filling: Cheddar cheese powder, 'salatrim' light fat, polydextrose, Edam-Emmenthal cheese powder Nutritional information:

| Serving size: 25 g = 1 sandwich (3 bits) | Reference product: filled cracker | |
|---|---|---|
| Calories per serving | 100 | 140 |
| Calories from fat | 50 | 90 |
| | per serving | per serving |
| Total fat | 6 g | 10 g |
| saturated fat | 5 g | 7 g |
| Cholesterol | 9 mg | 9 mg |
| Sodium | 110 g | 100 g |
| Total carbohydrate | 9 g | 8 g |
| dietary fibre | 2 g | <0.5 g |
| sugars | <0.5 g | <0.5 g |
| Protein | 4 g | 4 g |

3) Seasoned thin crispbread Ingredients: Wholemeal rye flour, coconut fat, seasonings, yeast, salt Nutritional information:

| Serving size: 25 g = 11 pieces | Reference product: potato crisp | |
|---|---|---|
| Calories per serving | 100 | 130 |
| Calories from fat | 40 | 70 |
| | per serving | per serving |
| Total fat | 4 g | 8 g |
| saturated fat | 3 g | 2 g |
| Cholesterol | 0 mg | 0 mg |
| Sodium | 200 mg | 160 mg |
| Total carbohydrate | 12 g | 12 g |
| dietary fibre | 3 g | 2 g |
| sugars | <1 g | <0.5 g |
| Protein | 2 g | <1 g |

The above general description of the invention and examples thereof are intended for illustrating the present invention, and they are by no means intended to restrict the invention. The invention relates to all other modifications in the spirit and within the scope of the invention, the modifications being possible and obvious to one skilled in the art.

What is claimed is:

1. A process for the manufacture of dry baked products in the form of ready-for-use pieces, comprising the steps of:
   (i) preparing a dough sheet;
   (ii) docking said dough sheet;
   (iii) baking said dough sheet after step (ii) to obtain a baked bread sheet;
   (iv) dividing said baked bread sheet into ready-for-use pieces while starch in said baked bread sheet is in an elastic state, by using a patterning device provided with blades, said blades pressing into said continuous baked bread sheet in the elastic state in such a manner that said blades penetrate the surface of said continuous baked bread sheet substantially all the way through the baked bread sheet, such that said baked bread sheet remains substantially continuous, to obtain a continuous baked bread sheet divided into ready-for-use pieces; and
   (v) hardening said continuous baked bread sheet divided into ready-for-use pieces such that the ready-for-use pieces are caused to separate from one another.

2. The process of claim 1 wherein step (v) is carried out by drying said continuous bread sheet.

3. The process of claim 1 wherein step (v) is carried out by cooling said continuous baked bread sheet.

4. The process of claim 1 wherein, prior to step (iv), said baked bread sheet is torn.

5. The process of claim 1 wherein step (iv) is carried out in connection with drying of said baked bread sheet.

6. The process of claim 1 wherein step (iv) is carried out by cutting, scoring, punching or perforating.

7. The process of claim 1 wherein step (iv) is carried out with round pattern devices.

8. The process of claim 7 wherein said round pattern devices create ready-for-use pieces having diameters of less than 5 cm.

\* \* \* \* \*

UNITED STATES PATENT AND TRADEMARK OFFICE
CERTIFICATE OF CORRECTION

PATENT NO. : 6,607,770 B2
DATED : August 19, 2003
INVENTOR(S) : Reinikainen et al.

It is certified that error appears in the above-identified patent and that said Letters Patent is hereby corrected as shown below:

<u>Title page,</u>
Item [73], Assignee, "Vasanmylly Oy" should read -- Vaasanmylly Oy --
Item [86], PCT No.: "PCT/FI97/00227" should read -- PCT/FI98/00227 --; and
PCT Date: "Jun. 2, 1999" should read -- Sep. 2, 1999 --

Signed and Sealed this

Sixteenth Day of December, 2003

JAMES E. ROGAN
*Director of the United States Patent and Trademark Office*